(12) United States Patent
Kawai (10) Patent No.: US 7,158,283 B2
(45) Date of Patent: *Jan. 2, 2007

(54) METHOD OF MANUFACTURING DISPLAY AND ELECTRONIC APPARATUS

(75) Inventor: Hideyuki Kawai, Fujimi-cho (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/268,639

(22) Filed: Nov. 8, 2005

(65) Prior Publication Data

US 2006/0103916 A1 May 18, 2006

(30) Foreign Application Priority Data

Nov. 16, 2004 (JP) ............................. 2004-331955

(51) Int. Cl.
*G02B 26/00* (2006.01)
*B01J 13/02* (2006.01)

(52) U.S. Cl. .................. 359/296; 430/32; 264/4.3; 264/4.4; 264/4.6; 427/213.32

(58) Field of Classification Search .............. 359/296; 430/32; 264/4–4.7; 427/213.31, 213.32
See application file for complete search history.

(56) References Cited

U.S. PATENT DOCUMENTS

| | | | |
|---|---|---|---|
| 6,724,520 B1 * | 4/2004 | Kawai | .................. 359/296 |
| 6,947,203 B1 * | 9/2005 | Kanbe | .................. 359/296 |
| 2003/0025855 A1 * | 2/2003 | Holman et al. | ................ 349/86 |
| 2004/0145562 A1 * | 7/2004 | Horikiri | ....................... 345/107 |
| 2005/0124751 A1 * | 6/2005 | Klingenberg et al. | ....... 524/502 |

FOREIGN PATENT DOCUMENTS

| | | |
|---|---|---|
| JP | 64-86116 | 3/1989 |
| JP | 2000-035769 | 2/2000 |
| JP | 2002-318396 | 10/2002 |
| JP | 2002-532756 | 10/2002 |
| WO | WO 00/36465 | 6/2000 |

OTHER PUBLICATIONS

Eiji Nakamura, et al., "Development of Electrophoretic Display Using Microcapsulated Suspension", Engineer of Development Dept., NOK Corp., 1988 SID,.

* cited by examiner

*Primary Examiner*—Evelyn A. Lester
(74) *Attorney, Agent, or Firm*—Harness, Dickey & Pierce, P.L.C.

(57) ABSTRACT

A method of manufacturing a display that includes a first substrate having a pixel electrode, a second substrate having a common electrode, and a microcapsule interposed between the first and second substrates, a display material being encapsulated in the microcapsule, an optical characteristic of the display material changing in response to an electrical stimulus. The method includes: selectively disposing a microcapsule material that includes the microcapsule on a display area formed of the pixel electrode of the first substrate or an area, of the second substrate, corresponding to the display area; drying the microcapsule material; and joining the first substrate to the second substrate after the drying.

8 Claims, 7 Drawing Sheets

METHOD OF MANUFACTURING DISPLAY AND ELECTRONIC APPARATUS

RELATED APPLICATION INFORMATION

This application claims priority to Japanese Patent No. 2004-331955, filed Nov. 16, 2004, whose contents are expressly incorporated herein by reference.

BACKGROUND OF THE INVENTION

1. Technical Field

The present invention relates to a method of manufacturing a display including microcapsules, and an electronic apparatus including a display obtained by this manufacturing method.

2. Related Art

As the related art, electrophoretic displays that have an electrophoretic dispersion liquid including a liquid dispersion medium and electrophoretic particles have been known. The electrophoretic displays utilize optical characteristic changes of the electrophoretic dispersion liquid resulting from distribution changes of the electrophoretic particles caused by application of an electric field. Such electrophoretic displays need no backlight and thus permit lower costs and a thinner form. In addition, the electrophoretic displays offer a wide viewing angle and a high contrast, and allow memorization of a displayed image. Therefore, the electrophoretic displays have been a focus of attention as a next-generation display.

For the electrophoretic displays, a method has been proposed in which an electrophoretic dispersion liquid is encapsulated in microcapsules. For example, Japanese Unexamined Patent Publication No. 1-86116 discloses an example of this method. This encapsulation of an electrophoretic dispersion liquid in microcapsules provides advantages of preventing the effusion of the dispersion liquid caused in manufacturing steps of the display, and reducing sedimentation and aggregation of the electrophoretic particles.

Typically such an electrophoretic display including microcapsules is fabricated as follows: A whole surface of a substrate having a common electrode thereon is coated with microcapsules. Another substrate having pixel electrodes thereon is applied to the microcapsule-coated surface to laminate the substrate. For example, this fabrication method is disclosed in Japanese Unexamined Patent Publications No. 2002-318396 (paragraph [0003], in particular) and No. 2002-532756 (FIG. 7B, in particular), and SID98DIGEST pp. 1014–1017.

A method is also known in which microcapsules are ejected one by one on pixel electrodes from ink jet nozzles. For example, Japanese Unexamined Patent Publication No. 2000-35769 discloses an example of this method.

However, the above-described method of coating a whole surface of a substrate having a common electrode thereon with microcapsules has the following disadvantages.

(1) Since a whole surface of a substrate is coated with microcapsules, areas other than a display area contributing to actual display are needlessly coated with the microcapsules, resulting in a waste of part of the material.
(2) In the case of manufacturing a display by applying substrates to each other, typically formed on one substrate are conductive parts for applying a voltage to electrodes of the other substrate. Subsequently, the substrates are applied to each other so that the conductive parts are electrically coupled to the electrodes of the other substrate. Therefore, also in the above-described example, typically a conductive part is formed on a substrate having pixel electrodes thereon in advance, and then the substrate having the pixel electrodes is applied to a substrate having a common electrode so that the conductive part is electrically coupled to the common electrode. However, a whole surface of the substrate having the common electrode is coated with the microcapsules. Therefore, the microcapsules need to be removed from part to be electrically coupled to the conductive part before the applying of the substrates. In order to remove the microcapsules, a method of mechanically removing, or a method of chemically removing with a solvent or the like is used, for example. However, either method may damage the underlying common electrode, with the result that the display characteristics of the manufactured display are deteriorated. Furthermore, the removal of the applied microcapsules leads to a waste of the material.
(3) After the applying of the substrates, typically sealing is implemented between the peripheral parts of the substrates in order to protect the electrodes and microcapsules from moisture and so on. However, if the part to be sealed is coated with the microcapsules, the sealability between the substrates is lowered. Therefore, the microcapsules on the peripheral part of the substrate also need to be removed before the applying of the substrates. This removal of the microcapsules, however, results in the same disadvantages as those described in (2).

In addition, in the above-described method of ejecting microcapsules one by one from ink jet nozzles onto pixel electrodes, the applying time is problematically long and thus the productivity is low since a number of microcapsules need to be ejected and applied.

SUMMARY

An advantage of the invention is to provide a method of manufacturing a display for eliminating a waste of microcapsules as a material and preventing lowering of display characteristics and productivity due to removal of the microcapsules, and an electronic apparatus including a display obtained by the method.

An aspect of the invention provides a method of manufacturing a display that includes a first substrate having a pixel electrode, a second substrate having a common electrode, and a microcapsule interposed between the first and second substrates. Encapsulated in the microcapsule is a display material whose optical characteristic changes in response to an electrical stimulus. The method includes, selectively disposing a microcapsule material that includes the microcapsule on a display area formed of the pixel electrode of the first substrate or an area, of the second substrate, corresponding to the display area, drying the microcapsule material, and joining the first substrate to the second substrate after the drying.

According to the method of manufacturing a display, the microcapsule material including the microcapsule is selectively disposed on the display area or the area corresponding to the display area. This selective disposing only on required areas can eliminate a waste of the material. In addition, this selective disposing also eliminates the need of a step of removing the applied microcapsule. Therefore, lowering of display characteristics due to the removal step can be prevented and a waste of the material due to the removal can be eliminated.

In the method of manufacturing a display, the display material may be an electrophoretic dispersion liquid including a liquid dispersion medium and an electrophoretic particle.

According to the method, the display operates based on electrophoretic displaying, and thus achieves advantages of requiring no backlight, having a wide viewing angle and high contrast, and allowing memorization of a displayed image.

In the method of manufacturing a display, it is preferable to selectively dispose the microcapsule material on the display area formed of the pixel electrode of the first substrate.

Thus, the microcapsule material is disposed on the display area directly. Therefore, alignment and so forth in applying the microcapsule is facilitated and applying accuracy is enhanced.

In the method of manufacturing a display, in the disposing of the microcapsule material, it is preferable to use a dispenser to selectively dispose the microcapsule material.

Using a dispenser facilitates the selective disposing of the microcapsule material. Furthermore, the material can easily be applied almost regardless of the viscosity of the microcapsule material and the diameter of the microcapsule.

In using a dispenser, particularly if the display area is rectangular, it is preferable to use a dispenser that includes an approximately rectangular nozzle opening having a long side with the length approximately equal to the length of a long side or a short side of a rectangle of the display area. In addition, it is preferable to dispose the microcapsule material by moving the nozzle opening while dispensing the microcapsule material in a state in which the long side of the nozzle opening of the dispenser is aligned with a side, of a rectangle of the display area or the area corresponding to the display area, having the length approximately equal to the length of the long side of the nozzle opening.

Thus, the microcapsule material can selectively be disposed by positioning the dispenser and moving the dispenser along only one direction. Therefore, the applying step is facilitated and the process time thereof is shortened.

In the method of manufacturing a display, in the disposing of the microcapsule material, the microcapsule material may selectively be disposed on the display area formed of the pixel electrode of the first substrate.

Furthermore, in the joining of the first substrate to the second substrate, the first substrate may be joined to the second substrate by disposing a transparent conductive material to cover the microcapsule material that has been dried so as to form the common electrode, and applying a transparent substrate material of the second substrate to cover the common electrode.

According to the method, since the common electrode is formed by disposing the transparent conductive material to cover the dried microcapsule material, recesses of the surface irregularities attributed to the disposed microcapsules can be buried with the transparent conductive material. Therefore, in the case in which the second substrate serves as a display surface, lowering of display performance due to the formation of gaps among the microcapsules on the second substrate can be prevented.

In the method of manufacturing a display, it is preferable that the first substrate and the second substrate are a flexible substrate.

This feature widens the application range. For example, the obtained display can be used as electronic paper.

An electronic apparatus of an aspect of the invention includes a display obtained by the above-described method of manufacturing.

The electronic apparatus includes a display that is manufactured without a waste of the material and prevents lowering of display characteristics as described above. Thus, display reliability is not deteriorated and costs are reduced.

BRIEF DESCRIPTION OF THE DRAWINGS

The invention will be described with reference to the accompanying drawings, wherein like numbers refer to like elements, and wherein.

DESCRIPTION OF THE EMBODIMENTS

Embodiments of the invention will be described below in detail.

Prior to a description for a method of manufacturing a display according to the embodiments, one example of a display obtained by the manufacturing method will be described.

Figure 1:
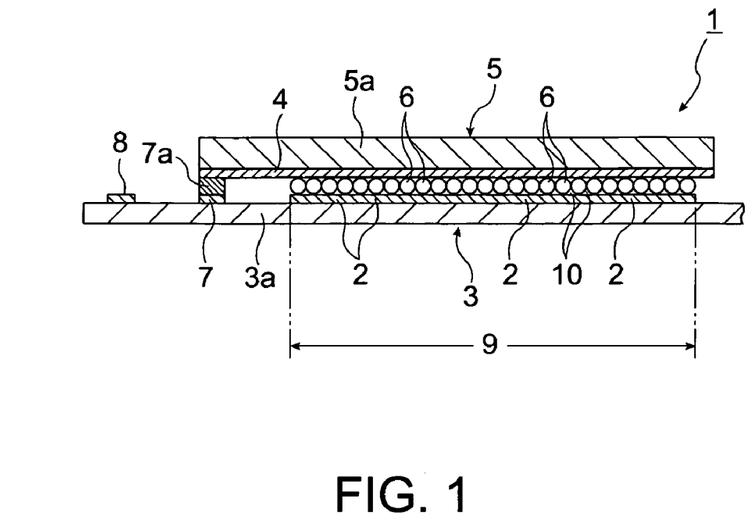
FIG. 1 is a side sectional view illustrating a schematic structure of one example of a display according to an embodiment of the invention.

FIG. 1 is a diagram showing one example of a display according to the embodiments, and illustrates a display 1. The display 1 includes a first substrate 3 having a plurality of pixel electrodes 2, a second substrate 5 having a common electrode (counter electrode) 4, and microcapsules 6 in which a display material is encapsulated, interposed between the substrates 3 and 5. In the display 1, either one or both of the substrates can be employed as a display surface (viewing surface). In this case, the substrate to serve as the display surface and the electrode on the substrate are required to have a high optical transparency. In particular, transparent substrate and electrode are preferable.

The first substrate 3 is fabricated by forming, on a substrate 3a, the plurality of pixel electrodes 2, wires (not shown) coupled to the pixel electrodes 2, a conductive part 7 electrically coupled via a conductive material 7a to the common electrode 4 of the second substrate 5 to be described later, a wire (not shown) coupled to the conductive part 7, a terminal 8 coupled to each of the wires, and the like. The first substrate 3 is rectangle. The second substrate 5 is fabricated by forming the common electrode 4 on a substrate 5a, and is also rectangle. A color filter is formed on one surface of the common electrode 4 according to need.

Particularly if the display 1 is used in a flexible application, such as an IC card or electronic paper, and thus needs to have flexibility, as the substrates 3a and 5a of the first and second substrates 3 and 5, a rectangular resin substrate in a film or sheet form is used. In addition, if the substrate serves as the display surface (viewing surface), a transparent material (having a high optical transparency) is used for the substrate as described above. As the material of such a transparent resin substrate, for example, polyethylene terephthalate (PET), polyethersulphone (PES), or polycarbonate (PC) is preferably used. If the substrate does not serve as the display surface, a transparent material (having a high optical transparency) is not required. In this case, besides the above-described materials, polyester such as polyethylene naphthalate (PEN), polyethylene (PE), polystyrene (PS), polypropylene (PP), polyetheretherketone (PEEK), acrylic resin, a polyacrylate, or the like can be used.

In the case of the display that is not required to have flexibility, such as a typical display panel, glass, hard resin, or a semiconductor substrate of silicon or the like can be used.

Also as for the pixel electrode 2 and the common electrode 4, if the electrode is formed on the substrate to serves as the display surface (viewing surface) as described above, a transparent material (having a high light transparency) is used for the electrode. Specifically, conductive oxides such as indium tin oxide (ITO), electron conductive polymers such as polyaniline, and ion conductive polymers in which an ionic material such as NaCl, LiClO$_4$ or KCl is dispersed in a matrix resin such as polyvinyl alcohol resin or polycarbonate resin are exemplified. One or more of the materials are selected and used. In contrast, if the electrode is formed on the substrate that does not serve as the display surface, a transparent material (having a high optical transparency) is not required for the electrode. In this case, a typical conductive material, such as aluminum (Al), can be used.

In particular, the pixel electrodes 2 constitute an essential part of a display area to be described later. Specifically, the display area in the embodiments of the invention is composed of the pixel electrodes 2 and an area serving as the background of displaying by the pixel electrodes 2. More specifically, the background area is composed mainly of parts among the pixel electrodes 2, and includes the peripheral part of the pixel electrodes 2 according to need. The purpose of defining the peripheral part of the pixel electrodes 2 as the display area is to use the peripheral part as a margin for permitting small misalignment in applying a microcapsule material as described later.

For example, if the pixel electrodes 2 are arranged in a matrix, the background part of displaying is composed of parts among the pixel electrodes and the peripheral part of the pixel electrodes (the peripheral part may be excluded). In addition, particularly if the pixel electrodes 2 are segment electrodes, the background part of displaying is composed mainly of parts among the pixel electrodes (segment electrodes), electrodes serving as the background, and the peripheral part of the electrodes if needed.

Figure 2:
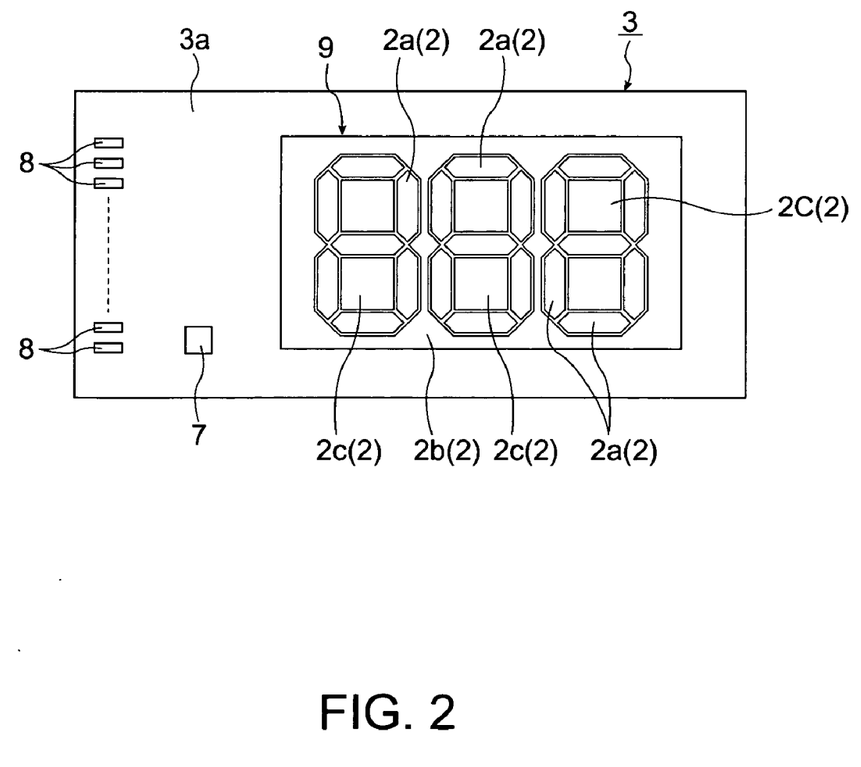
FIG. 2 is a plan view illustrating the internal side of a first substrate.

FIG. 2 is a plan view showing the internal side of the first substrate 3. On the first substrate 3, the pixel electrodes 2 include seven segment electrodes 2a referred to as so-called "seven-segment", and background electrodes 2b and 2c that form the background of displaying by the segment electrodes 2a. The segment electrodes 2a are arranged in a figure of eight so as to be able to display figures from zero to nine. In the embodiment, three sets of segment electrodes 2a are formed to allow displaying of three digit figures. In contrast to the thus arranged segment electrodes 2a, the background electrodes 2b are arranged outside the segment electrodes 2a while the background electrodes 2c are arranged to be surrounded by four segment electrodes 2a. The background electrodes 2b and 2c are coupled to each other between the segment electrodes 2a, for example, and thus invariably have the same potential, although not shown in the drawing.

The areas on the segment electrodes 2a and the background electrodes 2b and 2c, the areas among the electrodes, and the peripheral part of the background electrodes 2b if needed, integrally correspond to a rectangular display area 9.

In the display 1 of the embodiment, the microcapsules 6 into which the display material is encapsulated are selectively disposed only on the display area 9 with being fixed by a binder 10 between the first and second substrates 3 and 5 as shown in FIG. 1.

The display material encapsulated in the microcapsules 6 changes its optical characteristics in response to an electrical stimulus. Specifically, the material is composed mainly of the above-described electrophoretic particles or a liquid crystal.

As the material composed mainly of electrophoretic particles, an electrophoretic dispersion liquid composed of electrophoretic particles and a liquid dispersion medium for dispersing the particles is used.

As the liquid dispersion medium, a single or a mixture of the following materials to which a surfactant and so on is added can be used: water; alcohol solvents such as methanol, ethanol, isopropanol, butanol, octanol and methyl cellosolve; esters such as ethyl acetate and butyl acetate; ketones such as acetone, methyl ethyl ketone and methyl isobutyl ketone; aliphatic hydrocarbons such as pentane, hexane and octane; alicyclic hydrocarbons such as cyclohexane and methylcyclohexane; aromatic hydrocarbons having long-chain alkyl groups such as benzene, toluene, xylene, hexylbenzene, butylbenzene, octylbenzene, nonylbenzene, decylbenzene, undecylbenzene, dodecylbenzene, tridecylbenzene and tetradecylbenzene; halogenated hydrocarbons such as methylene chloride, chloroform, carbon tetrachloride and 1,2-dichloroethane; carboxylates; and other various oils.

The electrophoretic particles are organic or inorganic particles (high molecules or colloids) having the property of moving based on electrophoresis due to a potential difference in the liquid dispersion medium.

As the electrophoretic particles, for example, one or more of the following pigments can be used: black pigments such as aniline black, carbon black and titanium black; white pigments such as titanium dioxide, zinc oxide and antimony trioxide; yellow pigments such as monoazo, disazo, polyazo, other azo pigments, isoindolinone, yellow lead oxide, yellow iron oxide, cadmium yellow, titanium yellow and antimony; red pigments such as monoazo, disazo, polyazo, other azo pigments, quinacridone red and chrome vermillion; blue pigments such as phthalocyanine blue, indanthrene blue, anthraquinone dyes, prussian blue, ultramarine blue and cobalt blue; and green pigments such as phthalocyanine green.

In addition, if necessary, the following agents can be added to these pigments: a charge controlling agent formed of particles of an electrolyte, surfactant, metal soap, resin, rubber, oil, varnish, compound or the like; a dispersion agent such as a titanium coupling agent, aluminum coupling agent or silane coupling agent; a lubricating agent; a stabilizing agent; and so forth.

As a material to form a wall film of the microcapsules 6, a composite film of gum Arabic and gelatin, or a compound such as urethane resin or urea resin can be used.

As a material of the binder 10 to fix the microcapsules 6, a material can be used that has a good affinity for the wall film of the microcapsules 6, an excellent adhesiveness to the base member, and electrical insulation ability. For example, any of the following materials can be used: thermoplastic resins such as polyethylene, chlorinated polyethylene, ethylene-vinyl acetate copolymer, ethylene-ethyl acrylate copolymer, polypropylene, ABS resin, methyl methacrylate resin, vinyl chloride resin, vinyl chloride-vinyl acetate copolymer, vinyl chloride-vinylidene chloride copolymer, vinyl chloride-acrylic acid ester copolymer, vinyl chloride-methacrylic acid copolymer, vinyl chloride-acrylonitrile copolymer, ethylene-vinyl alcohol-vinyl chloride copolymer, propylene-vinyl chloride copolymer, vinylidene chloride resin, vinyl acetate resin, polyvinyl alcohol, polyvinyl formal, and cellulose resin; polymers such as polyamide resin, polyacetal, polycarbonate, polyethylene terephthalate, polybutylene terephthalate, polyphenylene oxide, polysulfone, polyamide imide, polyaminobismaleimide, polyethersulfone, polyphenylene sulfone, polyarylate, grafted polyphenylene ether, polyetheretherketone, and polyetherimide; fluororesins such as polyethylene tetrafluoride, polyethylene propylene fluoride, ethylene tetrafluoride-perfluoroalkoxyethylene copolymer, ethylene-ethylene tetrafluoride copolymer, polyvinylidene fluoride, polyethylene trifluorochloride, and fluororubber; silicon resins such as silicone resins and silicone rubber; and other materials such as methacrylic acid-styrene copolymer, polybutylene, and methyl methacrylate-butadiene-styrene copolymer.

In the display 1 of the embodiment, two kinds of electrophoretic particles are encapsulated in the microcapsule 6. One is charged with negative electricity, the other is charged with positive electricity. As the two kinds of the electrophoretic particles, for example, titanium dioxide, which is a white pigment, and carbon black, which is a black pigment, are used. If the two kinds, the white and black electrophoretic particles are used, figures or the like can be displayed with the block electrophoretic particles.

Alternatively, only one kind of electrophoretic particles may be used so that displaying is achieved by the electrophoresis thereof toward the common electrode 4 or the pixel electrode 2.

A manufacturing method according to embodiments of the invention will be described based on a method of manufacturing the display 1 having the above-described structure.

First Embodiment

A description will be made as to the case in which the first substrate 3 having the pixel electrodes 2 is a glass substrate. If the first substrate 3 is a glass substrate, in the case of applying microcapsules on the first substrate 3, the microcapsules need to be applied batchwise on the glass substrates one by one, resulting in production disadvantages. Therefore, even if the first substrate 3 is not a flexible substrate, typically a flexible substrate in a form of sheet, film or the like is used as the second substrate 5 and microcapsules are applied on this flexible substrate.

In the case of applying microcapsules on the flexible substrate, for example, a reel-to-reel feeding-winding method is used in which a sheet or film flexible substrate material wound to a feeding drum is flowed to a winding drum, and sequential coating and drying are continuously implemented for the flowing material between the drums. This method can increase productivity. After the completion of these processes, the processed flexible substrate material is cut into single plates before being applied to the glass substrate.

Figure 3A:
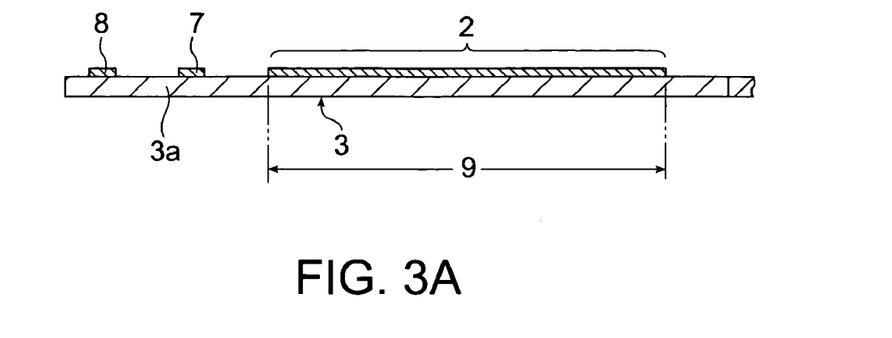
FIGS. 3A, 3B and 3C are diagrams for illustrating, in the order of manufacturing steps, a manufacturing method according to an embodiment of the invention.

As described above, in the first embodiment, the first substrate 3 is prepared by forming, on the glass substrate 3*a*, the pixel electrodes 2, the conductive part 7 and the terminal 8 as shown in FIG. 3A. The pixel electrodes 2 are composed of the segment electrodes 2*a* and the background electrodes 2*b* and 2*c* as shown in FIG. 2. Thus, the display area 9 is formed on the first substrate 3 as shown in FIG. 3A.

Figure 3B:
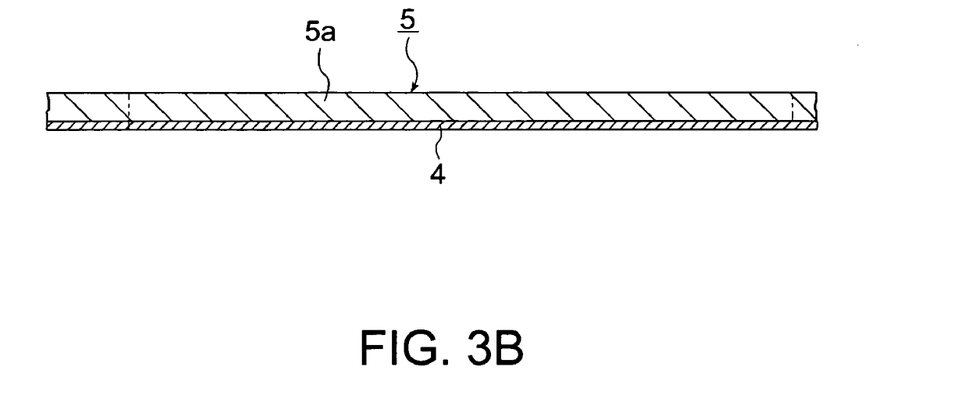

In addition to the substrate 3, the second substrate 5 is prepared as shown in FIG. 3B. The second substrate 5 is in a sheet or film form as described above, and has not been cut into single plates yet. Specifically, the second substrate 5 is prepared by forming the common electrode 4 composed of a transparent conductive material on the whole inner-side surface of the flexible substrate 5*a* as a substrate material.

Figure 3C:
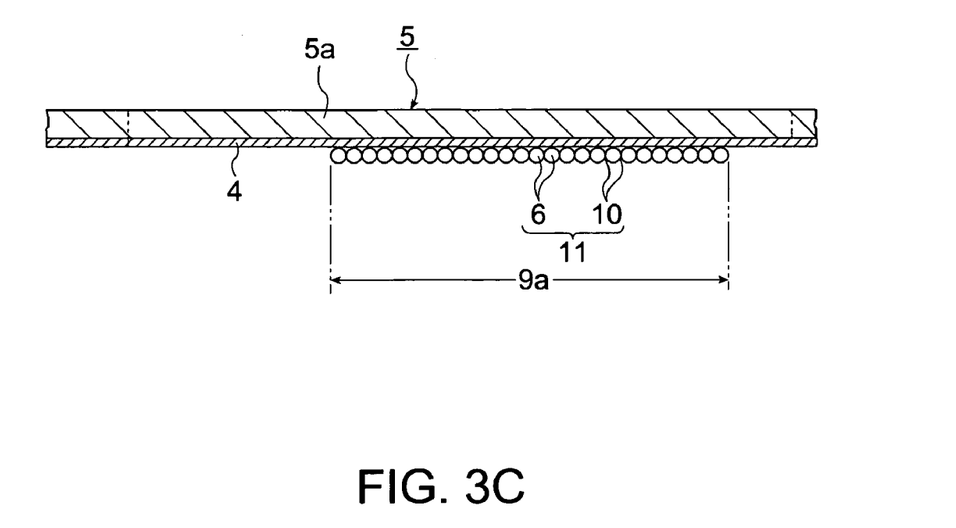

In particular, in the first embodiment, a microcapsule material 11 including the microcapsules 6 is selectively disposed on the second substrate 5 as shown in FIG. 3C. The microcapsule material 11 is prepared by mixing the microcapsules 6 and the binder 10 at a proper compound ratio. The microcapsule material 11 is not disposed over the whole surface of the common electrode 4 of the second substrate 5 but selectively disposed only on a predetermined place.

Specifically, the microcapsule material 11 is selectively disposed only on an area 9*a* corresponding to the display area 9. The area 9*a* corresponding to the display area 9 is the area that overlaps the display area 9 of the first substrate 3 when the first and second substrates 3 and 5 are opposingly applied to each other such that the electrodes are located internally of the display. By selectively disposing the microcapsule material 11 on the area 9*a* corresponding to the display area 9, i.e., the area overlapping the display area 9, on the second substrate 5 as described above, the microcapsules 6 are selectively disposed only on the display area 9 with being fixed by the binder 10 in the finished display 1 as shown in FIG. 1.

There is no particular limitation on a method for selectively disposing the microcapsule material 11 on the area 9*a* corresponding to the display area 9. For example, various kinds of printing methods, such as screen printing, and methods employing a dispenser are available. In the case in which the display area 9 is rectangular as described above and therefore the corresponding area 9*a* is also rectangular, the methods employing a dispenser are particularly preferable.

Figure 4A:
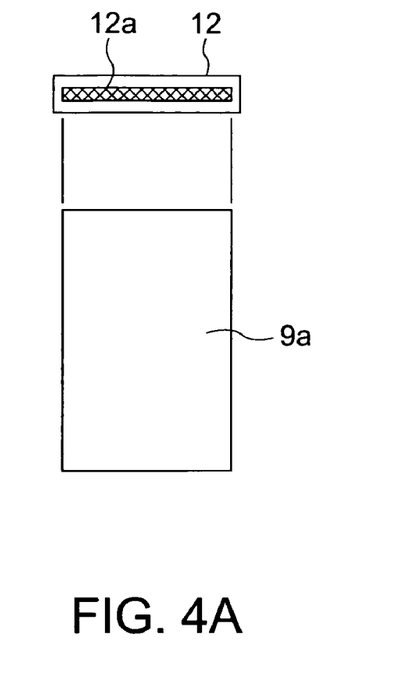
FIGS. 4A and 4B are explanatory diagrams of an applying method employing a dispenser.

FIGS. 4A and 4B are diagrams for illustrating a method of using a dispenser to selectively dispose the microcapsule material 11 on the area 9*a* corresponding to the display area 9. In the case of selectively disposing the microcapsule material 11 on the rectangular area 9*a*, as shown in FIG. 4A, it is preferable to use a dispenser with the following characteristics: An opening 12*a* of a nozzle 12 of the dispenser has a rectangular shape. The long sides of the opening 12*a* of the nozzle 12 have almost the same length as that of the short or long sides (short sides, in the present embodiment) of the area 9*a*.

Figure 4B:
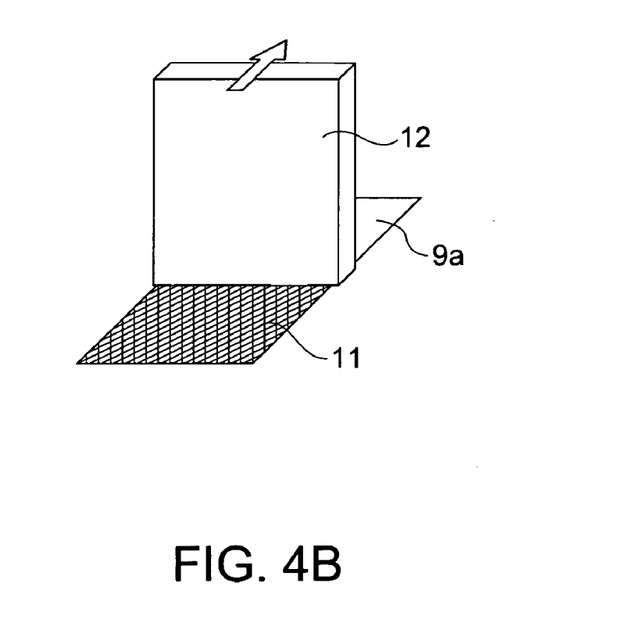

In order to selectively dispose the microcapsule material 11 on the area 9*a*, the long sides of the opening 12*a* of the nozzle 12 are aligned with the short sides of the area 9*a*, and in the aligned state, the opening 12a of the nozzle 12 is moved while dispensing the microcapsule material 11 as shown in FIG. 4B.

According to the above-described applying process, the microcapsule material 11 can selectively be deposited by positioning the nozzle 12 of the dispenser and subsequently moving the nozzle 12 along only one direction. Therefore, the applying process can be implemented easily and the process time thereof can be shortened. In addition, since a dispenser is used, the material can easily be applied almost regardless of the viscosity of the microcapsule material 11 and the diameters of the microcapsules.

After thus selectively disposing the microcapsule material 11 on the area 9a corresponding to the display area 9, the microcapsule material 11 is dried. A drying method is not particularly limited. Various known drying methods, such as heat drying with a heater or the like, blow drying with a warm or hot air, and reduced-pressure drying, are available. This drying cures the binder 10, fixing the microcapsules 6 on the area 9a of the common electrode 4. In this case, the microcapsules 6 form a single layer structure in the state of being closely-packed (close-contact) to each other on the display area 9. Furthermore, through the drying, the microcapsules 6 are brought into close contact with the common electrode 4 of the second substrate 5 without any gap among the microcapsules 6.

Thereafter, the second substrate 5 thus coated with the microcapsules 6 and the first substrate 3 are opposingly joined to each other so that, in particular, the area 9a on which the microcapsules 6 have been disposed overlaps the display area 9 of the first substrate 3, and the conductive part 7 is electrically coupled to the common electrode 4 via the conductive material 7a provided in advance. The first substrate 3 is laminated in this state, completing the display 1 shown in FIG. 1.

If the second substrate 5 is in a sheet or film form and has not been cut into single plates yet as described above, the coating and drying processes are sequentially and continuously conducted. After the completion of these processes, the second substrate 5 is cut into single plates to be used before being applied to the first substrate 3 (glass substrate).

In the above-described method of manufacturing the display 1, the microcapsule material 11 including the microcapsules 6 is selectively disposed on the display area 9a corresponding to the display area 9. This selective disposing only on required areas can eliminate a waste of the material. In addition, a conventional process of removing the coated microcapsules 6 is not needed. Thus, lowering of display characteristics caused by the removal process can be prevented. Furthermore, a waste of the material resulting from the removal can be eliminated.

In addition, since a dispenser is used for the selective disposing of the microcapsule material 11, the material can easily be applied almost regardless of the viscosity of the microcapsule material 11 and the diameters of the microcapsules 6. Therefore, lowering of productivity, which is involved in the related-art methods employing an ink jet method, can be prevented.

Second Embodiment

A second embodiment of the method of manufacturing the display 1 having the above-described structure will be described.

The second embodiment is different from the first embodiment, mainly in that the first substrate 3 having the pixel electrodes 2 is not a glass substrate but a flexible substrate, and therefore the display 1 itself has flexibility.

In the case in which the first substrate 3 is a flexible substrate, by using a flexible substrate in a form of sheet, film or the like as the substrate 3a constituting the first substrate 3, microcapsules can be applied on the flexible substrate. Applying of the microcapsules on the first substrate 3 allows the above-described sequential coating and drying processes for enhancing productivity, and allows the microcapsules to be directly applied on the display area 9 formed on the first substrate 3.

Figure 5A:
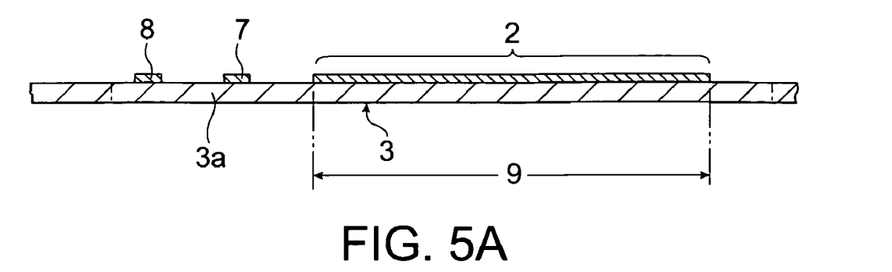
FIGS. 5A to 5D are diagrams for illustrating, in the order of manufacturing steps, a manufacturing method according to an embodiment of the invention.

Specifically, in the second embodiment, the first substrate 3 is prepared by forming, on the flexible substrate 3a, the pixel electrodes 2, the conductive part 7 and the terminal 8 as shown in FIG. 5A. The pixel electrodes 2 are composed of the segment electrodes 2a and the background electrodes 2b and 2c as shown in FIG. 2. Thus, the display area 9 is formed on the first substrate 3 as shown in FIG. 5A. The first substrate 3 is in a sheet or film form as described above, and has not been cut into single plates yet.

Figure 5B:
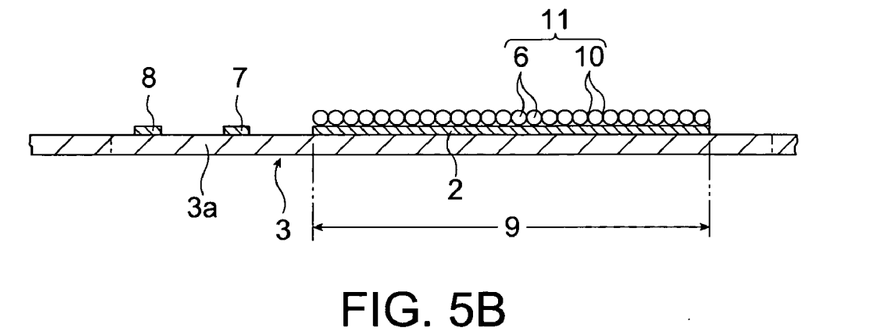

In particular, in the second embodiment, the microcapsule material 11 including the microcapsules 6 is selectively disposed on the first substrate 3 as shown in FIG. 5B. Specifically, the microcapsule material 11 is selectively disposed only on the display area 9. There is no particular limitation on a method for selectively disposing the microcapsule material 11 on the display area 9. Similarly with the first embodiment, various kinds of printing methods, such as screen printing, and methods employing a dispenser are available. In the case in which the display area 9 is rectangular in particular, the method employing a dispenser shown in FIGS. 4A and 4B is preferably used. In the present embodiment, the microcapsule material 11 is selectively disposed by the method employing a dispenser shown in FIGS. 4A and 4B.

After selectively disposing the microcapsule material 11 on the display area 9, the microcapsule material 11 is dried in the same way as the first embodiment. This drying fixes the microcapsules 6 on the display area 9. In this case, the microcapsules 6 form a single layer structure in the state of being closely-packed (close-contact) to each other on the display area 9. Furthermore, through the drying, the microcapsules 6 are brought into close contact with the display area 9 without any gap among the microcapsules 6.

The subsequent step is to join the first substrate 3 on which the microcapsules 6 have been fixed to the second substrate 5. In the second embodiment, instead of forming the common electrode 4 on the substrate 5a of the second substrate 5 in advance, the common electrode 4 and the second substrate 5a are separately joined to the substrate 3 sequentially, resulting in the joint of the second substrate 5 to the first substrate 3.

Figure 5C:
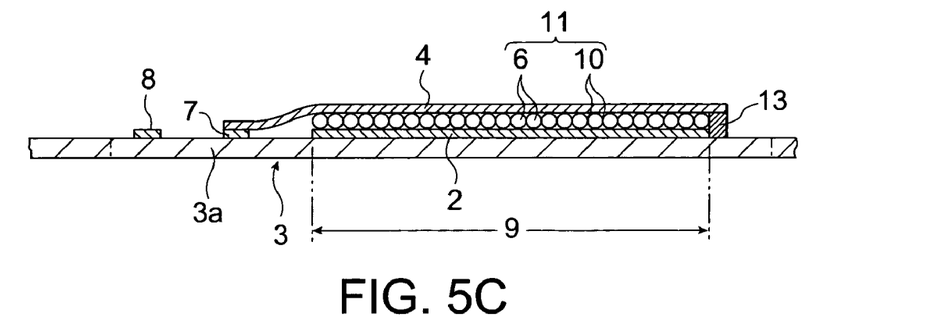

Specifically, in the present embodiment, as shown in FIG. 5C, a transparent conductive material is deposited to cover the microcapsules 6 on the display area 9 and the conductive part 7, which forms the common electrode 4. As the transparent conductive material, a conductive oxide such as indium tin oxide (ITO), an electron conductive polymer such as polyaniline, an ion conductive polymer in which an ionic material such as NaCl, $LiClO_4$ or KCl is dispersed in a matrix resin such as polyvinyl alcohol resin or polycarbonate resin, or another material can be used as described above. As a method for depositing the transparent conductive material, any of various known methods, such as applying methods, various printing methods, and vapor deposition methods, can be used depending on the kind and form of the transparent conductive material.

By thus forming the common electrode 4, recesses of surface irregularities attributed to the disposed microcapsules 6 can be buried with the transparent conductive material. In addition, in the second embodiment, the transparent conductive material can be disposed on the conductive part 7 of the first substrate 3 directly, requiring no conductive material 7a shown in FIG. 1.

After forming the common electrode 4, a sealing material 13 is disposed between the first substrate 3 and the common electrode 4, particularly on the outer circumference of the display area 9, to protect the pixel electrodes 2 and the microcapsules 6 from moisture and so forth.

Figure 5D:
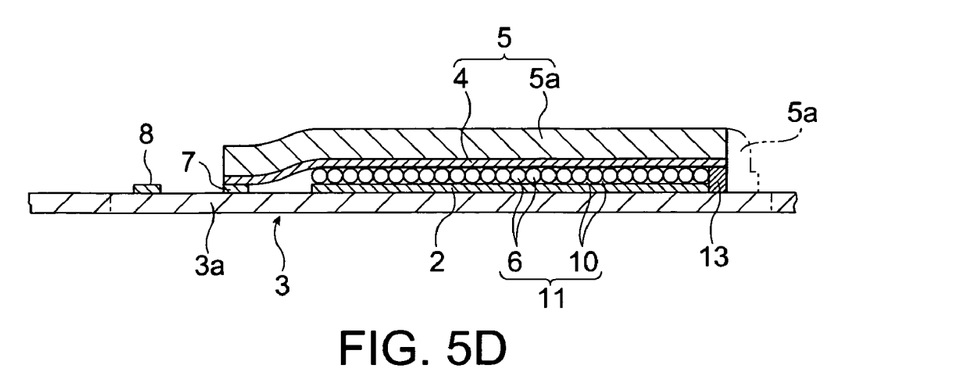

Subsequently, as shown in FIG. 5B, a transparent substrate material (the substrate 5a) serving as a flexible substrate is applied to cover the common electrode 4. This applying results in both the formation of the second substrate 5 and the joint of the second substrate 5 to the first substrate 3 (laminating of the first substrate 3). When applying the transparent substrate material (the substrate 5a), if the substrate material is applied not in a manner of merely covering the common electrode 4 as indicated with the solid line in FIG. 5D, but in a manner of covering the sealing material 13 as indicated with the chain double-dashed line in FIG. 5D, the sealability is more improved, which is preferable.

If both the first and second substrates 3 and 5 are in a sheet or film form and have not been cut into single plates yet, the completion of the joint process is followed by cutting of both the first and second substrates 3 and 5, achieving each single display 1.

In the above-described method of manufacturing the display 1, the microcapsule material 11 including the microcapsules 6 is selectively disposed on the display area 9. This selective disposing only on required areas can eliminate a waste of the material similarly with the first embodiment. In addition, a conventional process of removing the applied microcapsules 6 is not needed. Thus, lowering of display characteristics caused by the removal process can be prevented. Furthermore, a waste of the material resulting from the removal can be eliminated.

Furthermore, since a dispenser is used for the selective disposing of the microcapsule material 11, lowering of productivity can be prevented similarly with the first embodiment.

Furthermore, since the common electrode 4 is formed by disposing the transparent conductive material to cover the dried microcapsules 6, and the transparent substrate material (the substrate 5a) is applied to cover the common electrode 4, recesses of the surface irregularities attributed to the disposed microcapsules can be buried with the transparent conductive material. Therefore, in the case in which the second substrate 5 is a display surface, lowering of display characteristics due to the formation of gaps among the microcapsules 6 on the second substrate 5 can be prevented.

In addition, the microcapsule material 11 is directly disposed on the display area 9. Thus, the applying position and applying amount of the microcapsule material 11 can be controlled more easily and favorably.

It should be understood that the invention is not limited to the above-described embodiments but various modifications are available without departing from the scope and spirit of the invention. For example, the invention is not limited to the above-described embodiments in which the display material encapsulated in the microcapsules 6 is mainly composed of electrophoretic particles. The display material may be, for example, a liquid crystal.

In addition, although either one or both of the substrates are a flexible substrate in the embodiments, both may be a hard substrate.

Furthermore, although the embodiments have illustrated the case in which the display has only one display area, the manufacturing method according to the embodiments of the invention can be applied to the case in which a plurality of display areas are formed in an island independently of each other.

Electronic apparatuses according to an embodiment of the invention will be described below. The electronic apparatuses according to the embodiment of the invention are equipped with the display obtained by the above-described manufacturing method according to the embodiments of the invention.

Examples of the electronic apparatuses having the display will be described below.

Mobile Computer

Figure 6:
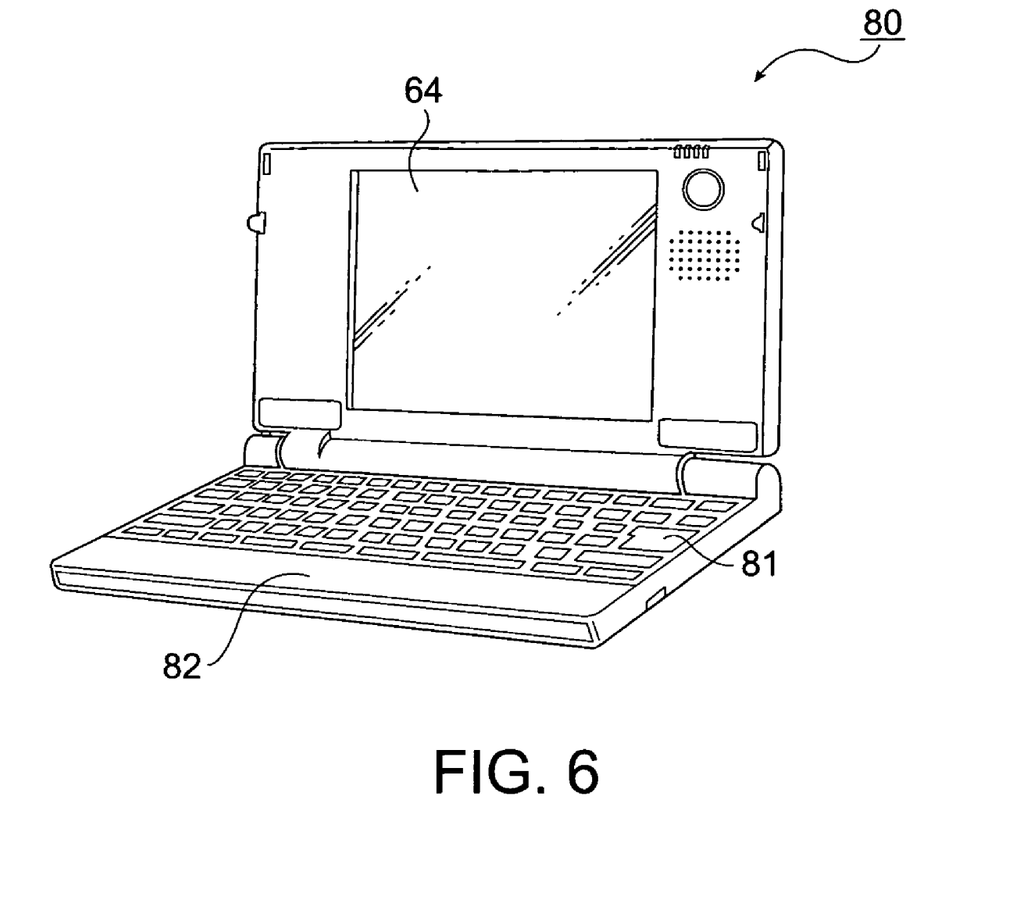
FIG. 6 is a perspective view showing the external configuration of a computer as an example of an electronic apparatus according to an embodiment of the invention.

First, an example will be described in which the display is applied to a mobile personal computer. FIG. 6 is a perspective view illustrating the configuration of the personal computer. Referring to FIG. 6, a personal computer 80 includes a body 82 provided with a keyboard 81 and a display unit provided with a display 64.

Cellular Phone

Figure 7:
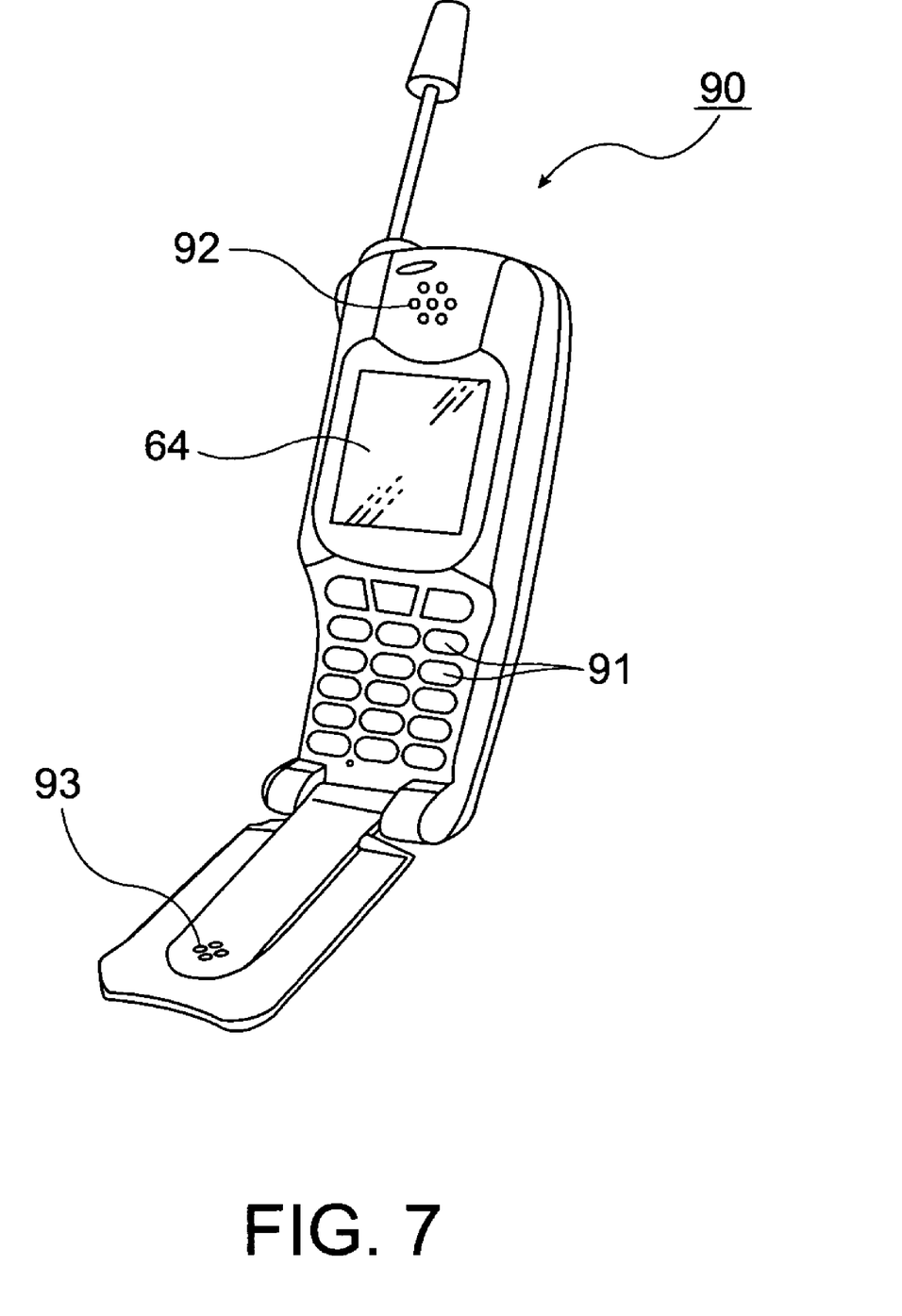
FIG. 7 is a perspective view showing the external configuration of a cellular phone as an example of the electronic apparatus according to the embodiment.

An example will be described in which the display is applied to a display part of a cellular phone. FIG. 7 is a perspective view illustrating the configuration of the cellular phone. Referring to FIG. 7, a cellular phone 90 includes a plurality of operational buttons 91, an earpiece 92, a mouthpiece 93, and the display 64.

Electronic Paper

Figure 8:
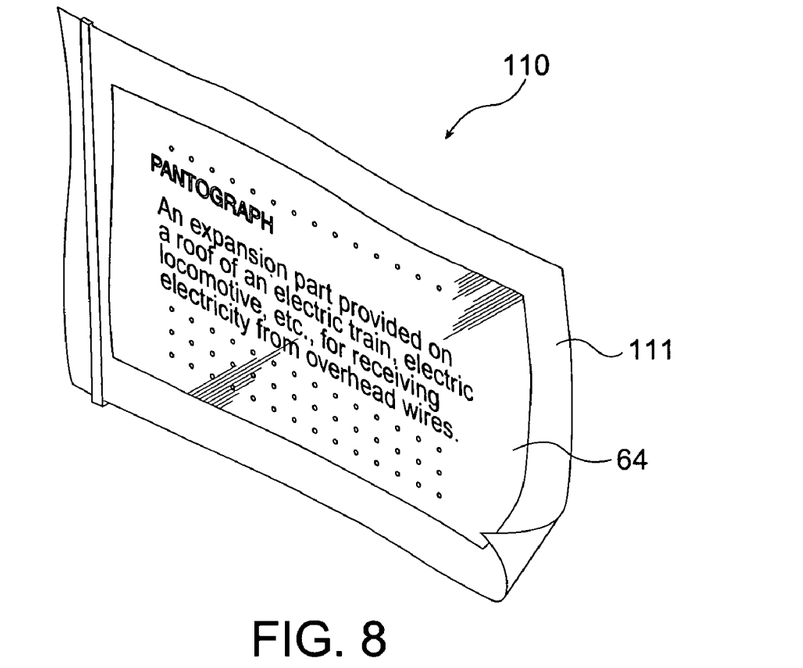
FIG. 8 is a perspective view showing the external configuration of electronic paper as an example of the electronic apparatus according to the embodiment.

An example will be described in which the display is applied to a display part of electronic paper. FIG. 8 is a perspective view illustrating the configuration of the electronic paper. Electronic paper 110 includes a body 111 made of a rewritable sheet having paperlike texture and flexibility, and a display unit provided with the display 64.

Electronic Notebook

Figure 9:
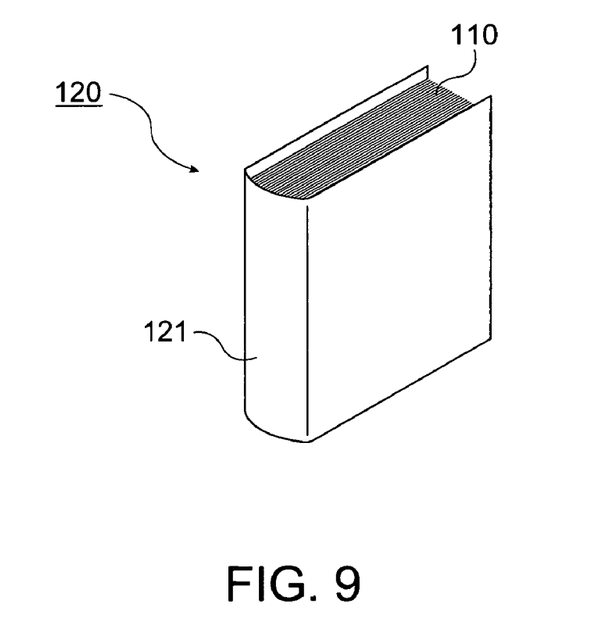
FIG. 9 is a perspective view showing the external configuration of an electronic notebook as an example of the electronic apparatus according to the embodiment.

FIG. 9 is a perspective view illustrating the configuration of an electronic notebook. Referring to FIG. 9, an electronic notebook 120 is obtained by bundling a plurality of pieces of the electronic paper 110 shown in FIG. 8, and sandwiching the electronic paper 110 with a cover 121. Providing the cover 121 with a display data input unit allows changes of displayed contents of the electronic paper in the bundled state.

The above-described electronic apparatuses include a display that is manufactured without a waste of the material and prevents lowering of display characteristics. Thus, display reliability is not deteriorated and costs are reduced.

As the above-described electronic apparatus, besides the personal computer of FIG. 6, the cellular phone of FIG. 7, the electronic paper of FIG. 8, and the electronic notebook of FIG. 9, for example, an IC card including the display in a display part, a fingerprint detection sensor and so on can be cited. In addition, the following apparatuses can be cited, for example: an electronic book, a videotape recorder of view finder type or monitor viewing type, a car navigation device, a pager, a personal digital assistance, an electronic calculator, a word processor, a workstation, a television phone, a POS terminal, and an apparatus having a touch panel. It should be obvious that the above-described display can be used as a display part of these various electronic apparatuses.

What is claimed is:

1. A method of manufacturing a display that includes a first substrate having a pixel electrode, a second substrate having a common electrode, and a microcapsule interposed between the first and second substrates, a display material being encapsulated in the microcapsule, an optical characteristic of the display material changing in response to an electrical stimulus, the method comprising:

selectively disposing a microcapsule material that includes the microcapsule on a display area formed of the pixel electrode of the first substrate or an area, of the second substrate, corresponding to the display area;

drying the microcapsule material; and joining the first substrate to the second substrate after the drying.

2. The method of manufacturing a display according to claim 1, the display material being an electrophoretic dispersion liquid including a liquid dispersion medium and an electrophoretic particle.

3. The method of manufacturing a display according to claim 1, the microcapsule material being selectively disposed on the display area formed of the pixel electrode of the first substrate.

4. The method of manufacturing a display according to claim 1, in the disposing of the microcapsule material, a dispenser is used to selectively dispose the microcapsule material.

5. The method of manufacturing a display according to claim 4, if the display area is rectangular, the microcapsule material being disposed by using the dispenser that includes an approximately rectangular nozzle opening having a long side with a length approximately equal to a length of a long side or a short side of a rectangle of the display area, and moving the nozzle opening while dispensing the microcapsule material in a state in which the long side of the nozzle opening of the dispenser is aligned with a side, of a rectangle of the display area or the area corresponding to the display area, having a length approximately equal to the length of the long side of the nozzle opening.

6. The method of manufacturing a display according to claim 1, in the disposing of the microcapsule material, the microcapsule material being selectively disposed on the display area formed of the pixel electrode of the first substrate,     in the joining of the first substrate to the second substrate, the first substrate being joined to the second substrate by disposing a transparent conductive material to cover the microcapsule material that has been dried so as to form the common electrode, and applying a transparent substrate material of the second substrate to cover the common electrode.

7. The method of manufacturing a display according to claim 1, the first substrate and the second substrate being a flexible substrate.

8. An electronic apparatus comprising a display obtained by the method of manufacturing according to claim 1.

\* \* \* \* \*